(12) United States Patent
Motoyoshi

(10) Patent No.: US 10,150,215 B2
(45) Date of Patent: *Dec. 11, 2018

(54) ROBOT CONTROL DEVICE AND ROBOT

(71) Applicant: Seiko Epson Corporation, Tokyo (JP)

(72) Inventor: Masaki Motoyoshi, Shiojiri (JP)

(73) Assignee: Seiko Epson Corporation (JP)

( * ) Notice: Subject to any disclaimer, the term of this patent is extended or adjusted under 35 U.S.C. 154(b) by 232 days.

This patent is subject to a terminal disclaimer.

(21) Appl. No.: 15/206,933

(22) Filed: Jul. 11, 2016

(65) Prior Publication Data

US 2016/0318183 A1 Nov. 3, 2016

Related U.S. Application Data

(63) Continuation of application No. 14/528,206, filed on Oct. 30, 2014, now Pat. No. 9,415,518.

(30) Foreign Application Priority Data

Oct. 31, 2013 (JP) ................................. 2013-226518

(51) Int. Cl.
*B25J 9/16* (2006.01)

(52) U.S. Cl.
CPC .......... *B25J 9/1641* (2013.01); *B25J 9/1694* (2013.01); *G05B 2219/39195* (2013.01);
(Continued)

(58) Field of Classification Search
CPC . B25J 9/02; B25J 9/1607; B25J 9/1635; B25J 9/1638; B25J 9/1641; B25J 9/1694;
(Continued)

(56) References Cited

U.S. PATENT DOCUMENTS 8,326,459 B2 * 12/2012 Zaier .................... B62D 57/032
318/568.12
8,577,504 B1 11/2013 Morrison et al.
(Continued)

FOREIGN PATENT DOCUMENTS

EP 0985989 A2 3/2000
EP 2639020 A2 9/2013
(Continued)

OTHER PUBLICATIONS

Extended European Search Report for Application No. EP 14 19 0859 dated Jul. 16, 2015 (8 pages).

*Primary Examiner* — Bao Long T Nguyen
(74) *Attorney, Agent, or Firm* — Harness, Dickey & Pierce, P.L.C.

(57) ABSTRACT

A robot control device controls the operation of a robot including a base; a robot arm that has at least three links, at least three joint portions, and at least three drive sources; an inertia sensor; and at least three angle sensors. The robot control device includes a first coordinate system vibration calculation unit; a second coordinate system vibration calculation unit; a weighting unit; a third coordinate system vibration calculation unit; a correction value calculation unit that obtains correction values for correcting the respective drive commands of the drive sources based on vibration information in a third coordinate system, and the respective detected results of the angle sensors; and a drive source control unit that controls the operations of the drive sources based on the respective drive commands of the drive sources, the correction values, and the respective detected results of the angle sensors.

20 Claims, 9 Drawing Sheets

(52) U.S. Cl.
CPC .............. *G05B 2219/39335* (2013.01); *G05B 2219/40597* (2013.01); *Y10S 901/28* (2013.01); *Y10S 901/46* (2013.01)

(58) Field of Classification Search
CPC ................ Y10S 901/02; Y10S 901/09; Y10S 901/14–901/15; Y10S 901/27–901/28; Y10S 901/46; G05B 15/00; G05B 2219/37388; G05B 2219/39195; G05B 2219/39335; G05B 2219/40597; G05B 2219/41025
USPC ...... 700/250–254, 258; 901/2, 9, 14, 15, 27, 901/28, 46
See application file for complete search history.

(56) References Cited

U.S. PATENT DOCUMENTS

| | | | |
|---|---|---|---|
| 9,302,388 B2 * | 4/2016 | Gomi | .................... B25J 9/1651 |
| 2006/0087275 A1 | 4/2006 | Sato et al. | |
| 2007/0288124 A1 | 12/2007 | Nagata et al. | |
| 2009/0234500 A1 | 9/2009 | Tanaka | |
| 2010/0148714 A1 | 6/2010 | Okita et al. | |
| 2010/0318223 A1 | 12/2010 | Motoyoshi et al. | |
| 2012/0035763 A1 * | 2/2012 | Motoyoshi | ............. B25J 9/1694 700/258 |
| 2012/0215357 A1 | 8/2012 | Igarashi et al. | |
| 2012/0296471 A1 | 11/2012 | Inaba et al. | |
| 2013/0073086 A1 * | 3/2013 | Motoyoshi | ............. G05B 15/00 700/258 |
| 2013/0190926 A1 | 7/2013 | Motoyoshi et al. | |
| 2013/0234642 A1 | 9/2013 | Igarashi et al. | |
| 2013/0253704 A1 | 9/2013 | Motoyoshi et al. | |
| 2014/0074290 A1 | 3/2014 | Kawai et al. | |
| 2014/0156077 A1 | 6/2014 | Motoyoshi et al. | |
| 2016/0236348 A1 | 8/2016 | Motoyoshi et al. | |

FOREIGN PATENT DOCUMENTS

| | | |
|---|---|---|
| JP | 05-069354 A | 3/1993 |
| JP | 05-324044 A | 12/1993 |
| JP | 06-274213 A | 9/1994 |
| JP | 06-332535 A | 12/1994 |
| JP | 10-097315 A | 4/1998 |
| JP | 10-100085 A | 4/1998 |
| JP | 11-198072 A | 7/1999 |
| JP | 2001-198870 A | 7/2001 |
| JP | 2006-082170 A | 3/2006 |
| JP | 2010-284770 A | 12/2010 |
| JP | 2011-136395 A | 7/2011 |
| JP | 2012-251870 A | 12/2012 |
| JP | 2013-099806 A | 5/2013 |

* cited by examiner

ROBOT CONTROL DEVICE AND ROBOT

CROSS-REFERENCE TO RELATED APPLICATIONS

This is a continuation patent application of U.S. application Ser. No. 14/528,206, filed on Oct. 30, 2014, which claims priority to Japanese Patent Application No. 2013-226518, filed on Oct. 31, 2013. Both applications are expressly incorporated by reference herein in their entireties.

BACKGROUND

1. Technical Field

The present invention relates to a robot control device, a robot, and a robot control method.

2. Related Art

In the related art, a robot with a robot arm is known. The robot arm is configured when a plurality of links are connected to each other via joint portions, and an end effector, for example, a hand is mounted on a link closest to a distal end. The joint portions are driven by a motor, and the joint portions are driven to turn the links. During the operation of the robot, an encoder detects a rotational angle of the motor, and the detected rotational angle is used to control the robot.

However, there is a problem in that a torque transmission mechanism, a speed reducer, and the links connected to the motor are not rigid bodies but have elasticity, thereby causing the robot arm to vibrate during the operation of the robot.

In a method that is devised so as to solve the problem, the vibration of a distal end portion of the robot arm is prevented by attaching an inertia sensor to the distal end portion of the robot arm, detecting the acceleration of the distal end portion of the robot arm using the inertia sensor, and executing a control via distribution of respective correction values to motors for turning the links using a Jacobi matrix or the like, the correction values being intended to prevent the vibration of the distal end portion of the robot arm (for example, JP-A-2011-136395).

However, in this method, when the posture of the robot arm is close to a specific posture, that is, when the robot arm is used in a stretched posture, the distribution of the respective correction values to the motors increases, that is, a feedback amount considerably increases in each of the motors, and thus the control of the robot becomes unstable.

SUMMARY

An advantage of some aspects of the invention is to provide a robot control device, a robot, and a robot control method that can prevent the vibration of a robot arm without putting the robot arm in an unstable operation state, even when the posture of the robot arm is close to a specific posture.

APPLICATION EXAMPLE 1

This application example is directed to a robot control device that controls the operation of a robot including a base; a robot arm having at least three links, at least three joint portions which connect two adjacent links and connect the base and one of the links disposed closest to a proximal end side, and at least three drive sources that drive the joint portions, respectively; an inertia sensor that is provided in a third or subsequent one of the links from the base; and at least three angle sensors that detect the respective rotational angles of the joint portions, respectively, the robot control device including: a first coordinate system vibration calculation unit that obtains vibration information of the position of the inertia sensor of the robot arm in a first coordinate system which is set in the link provided with the inertia sensor, based on a detected result of the inertia sensor; a second coordinate system vibration calculation unit that performs the coordinate transformation of the vibration information in the first coordinate system, the vibration information being obtained by the first coordinate system vibration calculation unit, into vibration information in a second coordinate system which is set in one of the links disposed further on a proximal end side than the link provided with the inertia sensor; a weighting unit that performs the weighting of a component of the vibration information in a predetermined coordinate axis direction of the second coordinate system, depending on the posture of the robot arm; a third coordinate system vibration calculation unit that performs the coordinate transformation of the weighted vibration information in the second coordinate system into vibration information in a third coordinate system which is set in one of the links, the one link being different from the link in which the second coordinate system is set; a correction value calculation unit that obtains correction values for correcting the respective drive commands of the drive sources based on the vibration information in the third coordinate system obtained by the third coordinate system vibration calculation unit, and the respective detected results of the angle sensors; and a drive source control unit that controls the operations of the drive sources based on the respective drive commands of the drive sources, the correction values, and the respective detected results of the angle sensors.

With this configuration, it is possible to decrease the correction values by performing the weighting of the component of the vibration information in the predetermined coordinate axis direction of the second coordinate system, depending on the posture of the robot arm. As a result, even when the posture of the robot arm is close to a specific posture, it is possible to prevent the vibration of the robot arm while stably operating the robot arm.

APPLICATION EXAMPLE 2

In the robot control device according to the application example described above, it is preferable that the robot arm has a first link that is connected to the base, and is turned about a first rotation axis; a second link that is connected to the first link, and is turned about a second rotation axis which is orthogonal to the first rotation axis or is parallel with an axis orthogonal to the first rotation axis; a third link that is connected to the second link, and is turned about a third rotation axis which is orthogonal to the second rotation axis or is parallel with an axis orthogonal to the second rotation axis; a first joint portion that connects the base and the first link; a second joint portion that connects the first link and the second link; a third joint portion that connects the second link and the third link; a first drive source that turns the first link by driving the first joint portion; a second drive source that turns the second link by driving the second joint portion; and a third drive source that turns the third link by driving the third joint portion, and the correction value calculation unit obtains a first correction value for correcting a drive command of a first drive source and a second correction value for correcting a drive command of a third drive source, based on the vibration information in the third coordinate system obtained by the third coordinate system vibration calculation unit, and the respective detected results of the angle sensors, and the drive source control unit prevents the vibration of the position of the inertia sensor of the robot arm by correcting the respective drive commands of the first and third drive sources using first and second correction values, respectively.

With this configuration, it is possible to more reliably and efficiently prevent the vibration of the robot arm.

APPLICATION EXAMPLE 3

In the robot control device according to the application example described above, it is preferable that the predetermined coordinate axis direction is any one of directions which are respectively orthogonal to the first rotation axis and the third rotation axis.

With this configuration, it is possible to more reliably and efficiently prevent the vibration of the robot arm.

APPLICATION EXAMPLE 4

In the robot control device according to the application example described above, it is preferable that, in a state where an angle $\theta$ formed by the first and third rotation axes is set to a range of $-180°$ or greater and $180°$ or less, when an absolute value of the angle $\theta$ is less than or equal to a first threshold value or greater than or equal to a fourth threshold value during the weighting process, the weighting unit sets a weighting constant to zero.

With this configuration, even when the robot arm is close to a specific posture, it is possible to stably operate the robot arm.

APPLICATION EXAMPLE 5

In the robot control device according to the application example described above, it is preferable that, in a state where an angle $\theta$ formed by the first and third rotation axes is set to a range of $-180°$ or greater and $180°$ or less, when an absolute value of the angle $\theta$ is greater than or equal to a second threshold value or less than or equal to a third threshold value during the weighting process, the weighting unit sets a weighting constant to one.

With this configuration, it is possible to quickly prevent vibration.

APPLICATION EXAMPLE 6

In the robot control device according to the application example described above, it is preferable that, in a state where an angle $\theta$ formed by the first and third rotation axes is set to a range of $-180°$ or greater and $180°$ or less, when an absolute value of the angle $\theta$ is greater than the first threshold value and less than the second threshold value, or when an absolute value of the angle $\theta$ is greater than the third threshold value and less than the fourth threshold value during the weighting process, the weighting unit increases the weighting constant continuously or stepwise during the weighting process as the absolute value of the angle $\theta$ increases.

With this configuration, even when the robot arm is close to a specific posture, it is possible to stably operate the robot arm, and it is possible to quickly prevent vibration.

APPLICATION EXAMPLE 7

This application example is directed to a robot control device that controls the operation of a robot including a base; a robot arm having at least three links, at least three joint portions which connect two adjacent links and connect the base and one of the links disposed closest to a proximal end side, and at least three drive sources that drive the joint portions, respectively; an inertia sensor that is provided in a third or subsequent one of the links from the base; and at least three angle sensors that detect the respective rotational angles of the joint portions, respectively, the robot control device including: a vibration calculation unit that obtains vibration information of the position of the inertia sensor of the robot arm based on a detected result of the inertia sensor; a correction value calculation unit that obtains correction values for correcting the respective drive commands of the drive sources based on the vibration information obtained by the vibration calculation unit, and the respective detected results of the angle sensors; a weighting unit that performs the weighting of the correction values depending on the posture of the robot arm; and a drive source control unit that controls the operations of the drive sources based on the respective drive commands of the drive sources, the weighted correction values, and the respective detected results of the angle sensors.

With this configuration, it is possible to decrease the correction values by performing the weighting of the correction values, depending on the posture of the robot arm. As a result, even when the posture of the robot arm is close to a specific posture, it is possible to prevent the vibration of the robot arm while stably operating the robot arm.

APPLICATION EXAMPLE 8

This application example is directed to a robot control device that controls the operation of a robot including a base; a robot arm having at least three links, at least three joint portions which connect two adjacent links and connect the base and one of the links disposed closest to a proximal end side, and at least three drive sources that drive the joint portions, respectively; an inertia sensor that is provided in a third or subsequent one of the links from the base; and at least three angle sensors that detect the respective rotational angles of the joint portions, respectively, the robot control device including: a vibration calculation unit that obtains vibration information of the position of the inertia sensor of the robot arm based on a detected result of the inertia sensor; a weighting unit that performs the weighting of the vibration information obtained by the vibration calculation unit, depending on the posture of the robot arm; a correction value calculation unit that obtains correction values for correcting the respective drive commands of the drive sources based on the weighted vibration information and the respective detected results of the angle sensors; and a drive source control unit that controls the operations of the drive sources based on the respective drive commands of the drive sources, the weighted correction values, and the respective detected results of the angle sensors.

With this configuration, it is possible to decrease the correction values by performing the weighting of the vibration information, depending on the posture of the robot arm. As a result, even when the posture of the robot arm is close to a specific posture, it is possible to prevent the vibration of the robot arm while stably operating the robot arm.

APPLICATION EXAMPLE 9

This application example is directed to a robot including: a base; a robot arm that has at least three links, at least three joint portions which connect two adjacent links, and connect the base and one of the links disposed closest to a proximal end side, and at least three drive sources that drive the joint portions, respectively; an inertia sensor that is provided in a third or subsequent one of the links from the base; at least three angle sensors that detect the respective rotational angles of the joint portions, respectively; and the robot control device of the invention.

With this configuration, it is possible to decrease the correction values by performing the weighting of the correction values, depending on the posture of the robot arm. As a result, even when the posture of the robot arm is close to a specific posture, it is possible to prevent the vibration of the robot arm while stably operating the robot arm.

APPLICATION EXAMPLE 10

In the robot according to the application example described above, it is preferable that the robot is a dual-arm robot.

With this configuration, it is possible to perform a variety of operations and work.

APPLICATION EXAMPLE 11

This application example is directed to a robot control method of controlling the operation of a robot including a base; a robot arm having at least three links, at least three joint portions which connect two adjacent links and connect the base and one of the links disposed closest to a proximal end side, and at least three drive sources that drive the joint portions, respectively; an inertia sensor that is provided in a third or subsequent one of the links from the base; and at least three angle sensors that detect the respective rotational angles of the joint portions, respectively, the robot control method including: obtaining vibration information of the position of the inertia sensor of the robot arm in a first coordinate system which is set in the link provided with the inertia sensor, based on a detected result of the inertia sensor; performing the coordinate transformation of the vibration information in the first coordinate system obtained in the obtaining of the vibration information of the position of the inertia sensor, into vibration information in a second coordinate system which is set in one of the links disposed further on a proximal end side than the link provided with the inertia sensor; performing the weighting of a component of the vibration information in a predetermined coordinate axis direction of the second coordinate system, depending on the posture of the robot arm; performing the coordinate transformation of the weighted vibration information in the second coordinate system into vibration information in a third coordinate system which is set in one of the links, the one link being different from the link in which the second coordinate system is set; obtaining correction values for correcting the respective drive commands of the drive sources based on the vibration information in the third coordinate system obtained in the performing of the weighted vibration information, and the respective detected results of the angle sensors; and controlling the operations of the drive sources based on the respective drive commands of the drive sources, the correction values, and the respective detected results of the angle sensors.

With this configuration, it is possible to decrease the correction values by performing the weighting of the component of the vibration information in the predetermined coordinate axis direction of the second coordinate system, depending on the posture of the robot arm. As a result, even when the posture of the robot arm is close to a specific posture, it is possible to prevent the vibration of the robot arm while stably operating the robot arm.

APPLICATION EXAMPLE 12

This application example is directed to a robot control method of controlling the operation of a robot including a base; a robot arm having at least three links, at least three joint portions which connect two adjacent links and connect the base and one of the links disposed closest to a proximal end side, and at least three drive sources that drive the joint portions, respectively; an inertia sensor that is provided in a third or subsequent one of the links from the base; and at least three angle sensors that detect the respective rotational angles of the joint portions, respectively, the robot control method including: obtaining vibration information of the position of the inertia sensor of the robot arm based on a detected result of the inertia sensor; obtaining correction values for correcting the respective drive commands of the drive sources based on the vibration information obtained in the obtaining of the vibration information of the position of the inertia sensor, and the respective detected results of the angle sensors; performing the weighting of the correction values depending on the posture of the robot arm; and controlling the operations of the drive sources based on the respective drive commands of the drive sources, the weighted correction values, and the respective detected results of the angle sensors.

With this configuration, it is possible to decrease the correction values by performing the weighting of the correction values, depending on the posture of the robot arm. As a result, even when the posture of the robot arm is close to a specific posture, it is possible to prevent the vibration of the robot arm while stably operating the robot arm.

APPLICATION EXAMPLE 13

This application example is directed to a robot control method of controlling the operation of a robot including a base; a robot arm having at least three links, at least three joint portions which connect two adjacent links and connect the base and one of the links disposed closest to a proximal end side, and at least three drive sources that drive the joint portions, respectively; an inertia sensor that is provided in a third or subsequent one of the links from the base; and at least three angle sensors that detect the respective rotational angles of the joint portions, respectively, the robot control method including: obtaining vibration information of the position of the inertia sensor of the robot arm based on a detected result of the inertia sensor; performing the weighting of the vibration information obtained by a vibration calculation unit, depending on the posture of the robot arm; obtaining correction values for correcting the respective drive commands of the drive sources based on the weighted vibration information and the respective detected results of the angle sensors; and controlling the operations of the drive sources based on the respective drive commands of the drive sources, the weighted correction values, and the respective detected results of the angle sensors.

With this configuration, it is possible to decrease the correction values by performing the weighting of the vibration information, depending on the posture of the robot arm. As a result, even when the posture of the robot arm is close to a specific posture, it is possible to prevent the vibration of the robot arm while stably operating the robot arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot control device, a robot, and a robot control method according to the invention will be described in detail based on preferred embodiments illustrated in the accompanying drawings.

Figure 1:
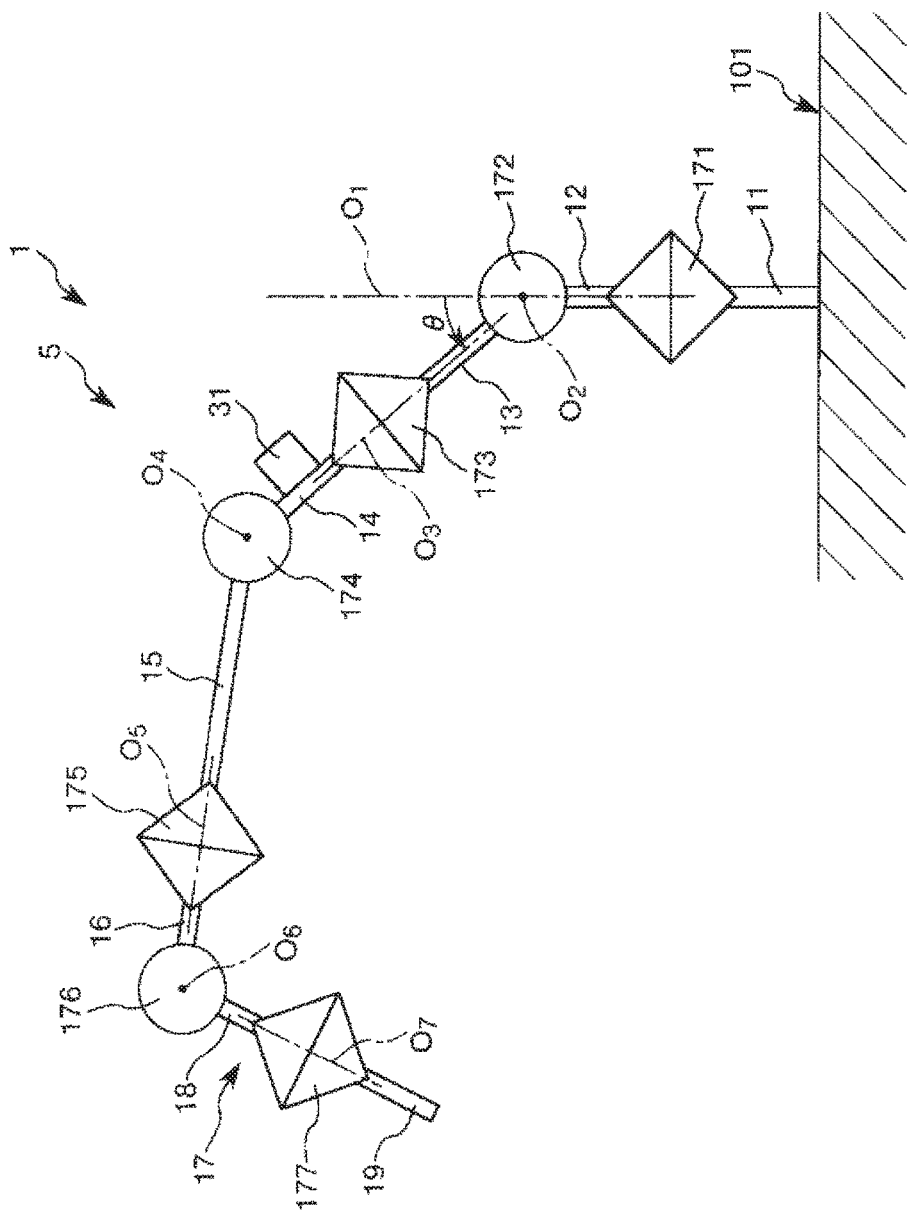
FIG. 1 is a schematic view of a robot main body of the robot according to a first embodiment of the invention.

FIG. 1 is a schematic view of a robot main body of the robot according to a first embodiment of the invention.

Figure 2:
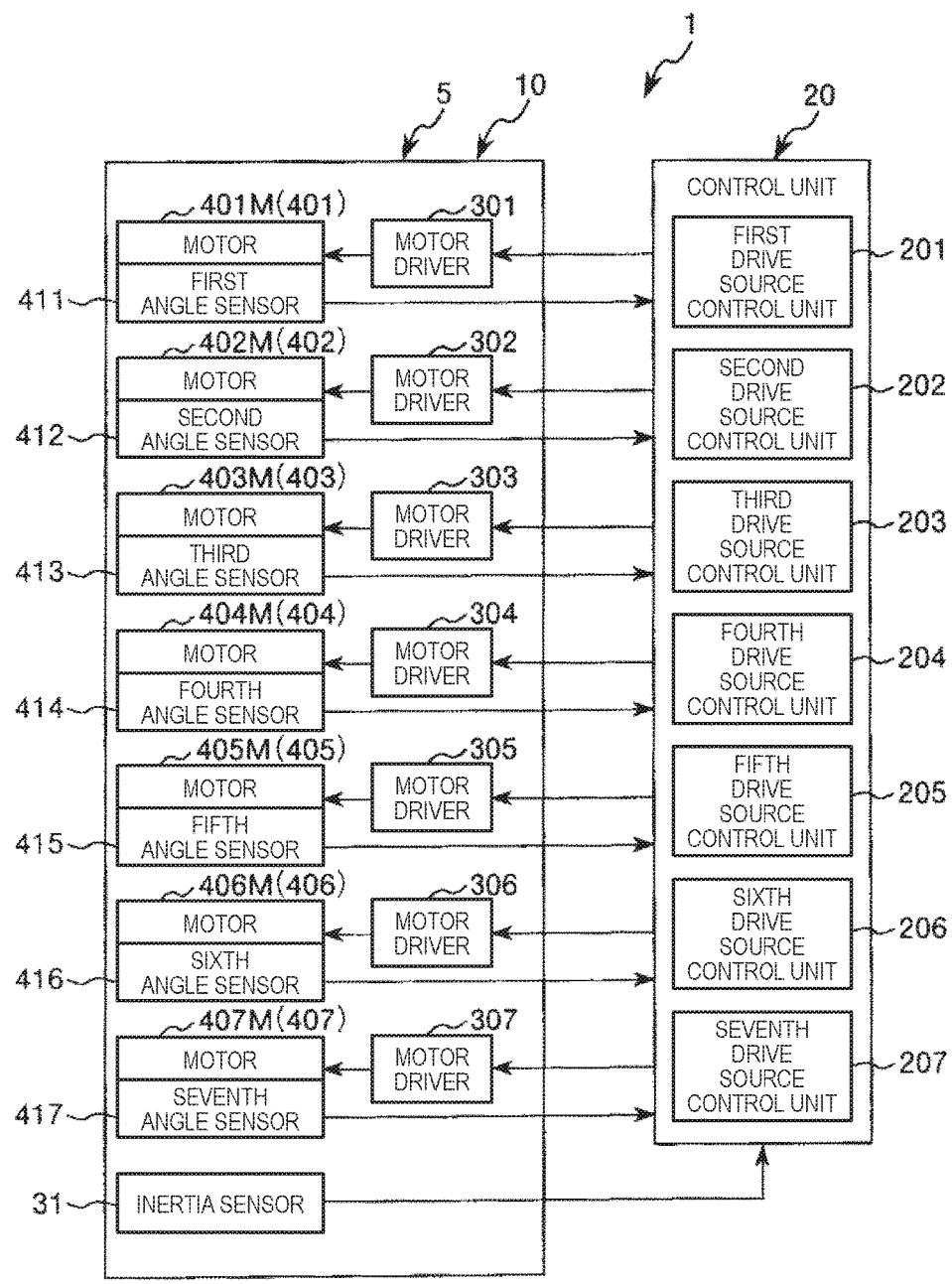
FIG. 2 is a block diagram of the robot illustrated in FIG. 1.

FIG. 2 is a block diagram of the robot illustrated in FIG. 1.

Figure 3:
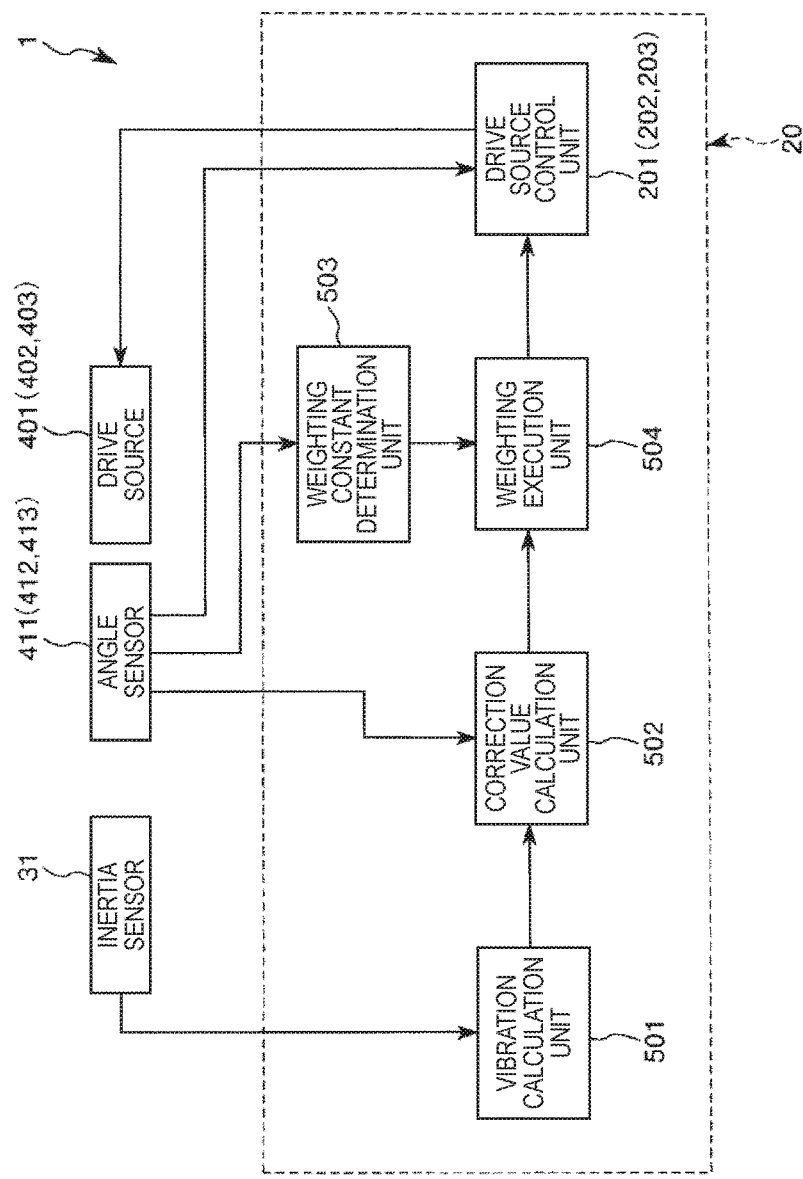
FIG. 3 is a block diagram of the robot illustrated in FIG. 1.

FIG. 3 is a block diagram of the robot illustrated in FIG. 1.

Figure 4:
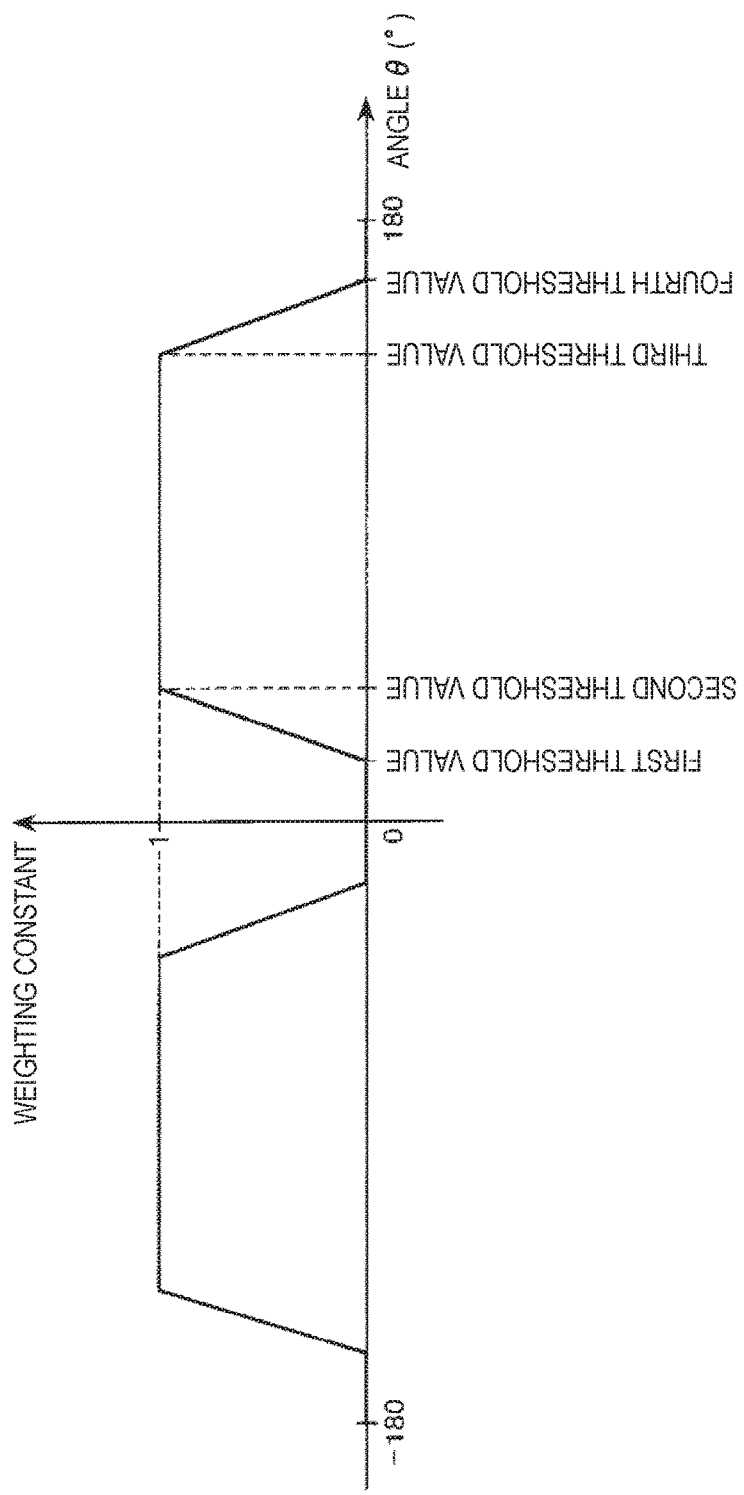
FIG. 4 is a graph describing a weighting constant of the robot illustrated in FIG. 1.
Figure 5:
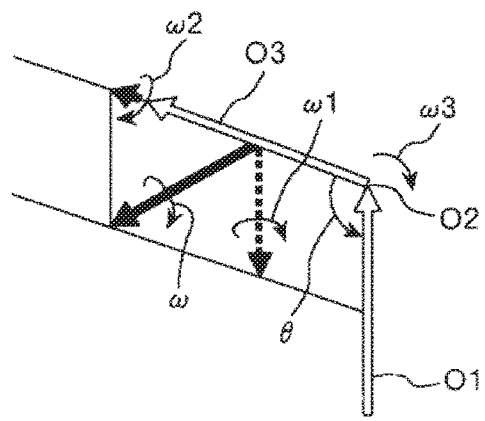
FIG. 5 is a diagram illustrating vibration information and a correction value of the robot illustrated in FIG. 1.
Figure 6:
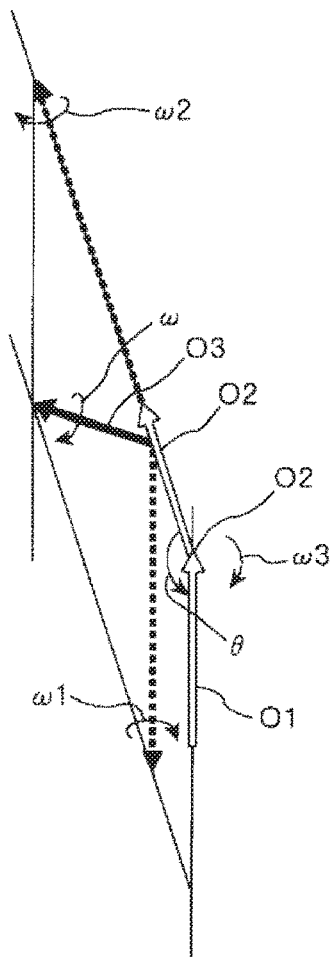
FIG. 6 is a diagram illustrating the vibration information and the correction value of the robot illustrated in FIG. 1.

FIG. 4 is a graph describing a weighting constant of the robot illustrated in FIG. 1. FIGS. 5 and 6 are diagrams illustrating vibration information and a correction value of the robot illustrated in FIG. 1.

Hereinafter, for descriptive purposes, in FIG. 1, an upper side indicates a "top" or an "upper portion", and a lower side indicates a "bottom" or a "lower portion". In FIG. 1, a base side indicates a "proximal end", and an opposite side of the base side indicates a "distal end". FIG. 3 representatively illustrates a third link portion of the robot main body.

A robot (an industrial robot) 1 illustrated in FIGS. 1 to 3 can be used in a manufacturing process of precision equipment such as a wrist watch, and has a robot main body (a main body portion) 10, and a robot control device (a control unit) 20 that controls the operation of the robot main body 10 (the robot 1). The robot main body 10 and the robot control device 20 are electrically connected to each other. For example, the robot control device 20 can be configured by a personal computer (PC) with a built-in central processing unit (CPU) or the like. The robot main body 10 and the robot control device 20 may be built integrally or separately. The robot control device 20 will be described in detail later.

The robot main body 10 has a robot arm 5 including a base (a supporting portion) 11; five links (arm portions) 12, 13, 14, 15, 16; a wrist 17 having two links (arm portions) 18, 19; and seven drive sources 401, 402, 403, 404, 405, 406, 407. That is, the robot 1 is a vertical articulated (seven axes) robot in which the base 11, the links 12, 13, 14, 15, 16, and the wrist 17 are connected in sequence from a proximal end side to a distal end side. The link 12 can be referred to as a "first link"; the link 13, a "second link"; the link 14, a "third link"; the link 15, a "fourth link"; the link 16, a "fifth link; and the wrist 17, "sixth and seventh links". An end effector or the like can be attached to the wrist 17.

As illustrated in FIG. 1, the links 12 to 16, and the wrist 17 are supported so as to be displaceable independently from the base 11. The respective lengths of the links 12 to 16 and the wrist 17 are not limited to specific dimensions, and are appropriately set depending on conditions.

The base 11 and the first link 12 are connected to each other via a first joint portion (a joint) 171. The function of the first joint portion 171 is to support the base 11 and the first link 12 connected to each other in such a manner that one of the base 11 and the first link 12 is turnable with respect to the other. At this time, the first link 12 has a first rotation axis O1 as a rotation center (an axis center), the first rotation axis O1 being parallel with a vertical direction, and is turnable about the first rotation axis O1 with respect to the base 11. The first rotation axis O1 coincides with a normal line of an upper surface of a bed 101, the upper surface being an installation surface for the robot 1. The turning about the first rotation axis O1 is realized by the driving of a first drive source 401. The first drive source 401 is driven by a motor 401M and a cable (not illustrated), and the robot control device 20 controls the motor 401M via a motor driver 301 that is electrically connected to the motor 401M. The first drive source 401 may transmit drive from the motor 401M via a speed reducer (not illustrated) that is provided along with the motor 401M, or the speed reducer may not be provided. For example, the base 11 of the robot main body 10 accommodates the motor 401M or motor drivers 301 to 307.

The first link 12 and the second link 13 are connected to each other via a second joint portion (a joint) 172. The function of the second joint portion 172 is to support the first link 12 and the second link 13 connected to each other in such a manner that one of the first link 12 and the second link 13 is turnable with respect to the other. At this time, the second link 13 has a second rotation axis O2 as a rotation center, and is turnable about the second rotation axis O2 with respect to the first link 12. The second rotation axis O2 is orthogonal to the first rotation axis O1. The turning about the second rotation axis O2 is realized by the driving of a second drive source 402. The second drive source 402 is driven by a motor 402M and a cable (not illustrated), and the robot control device 20 controls the motor 402M via a motor driver 302 that is electrically connected to the motor 402M. The second drive source 402 may transmit drive from the motor 402M via a speed reducer (not illustrated) that is provided in addition to the motor 402M, or the speed reducer may not be provided. The second rotation axis O2 may be parallel with an axis orthogonal to the first rotation axis O1. For example, the first link 12 accommodates the motor 402M.

The second link 13 and the third link 14 are connected to each other via a third joint portion (a joint) 173. The function of the third joint portion 173 is to support the second link 13 and the third link 14 connected to each other in such a manner that one of the second link 13 and the third link 14 is turnable with respect to the other. At this time, the third link 14 has a third rotation axis O3 as a rotation center, and is turnable about the third rotation axis O3 with respect to the second link 13. The third rotation axis O3 is orthogonal to the second rotation axis O2. The turning about the third rotation axis O3 is realized by the driving of a third drive source 403. The third drive source 403 is driven by a motor 403M and a cable (not illustrated), and the robot control device 20 controls the motor 403M via a motor driver 303 that is electrically connected to the motor 403M. The third drive source 403 may transmit drive from the motor 403M via a speed reducer (not illustrated) that is provided in addition to the motor 403M, or the speed reducer may not be provided. The third rotation axis O3 may be parallel with an axis orthogonal to the second rotation axis O2. For example, the second link 13 accommodates the motor 403M.

The third link 14 and the fourth link 15 are connected to each other via a fourth joint portion (a joint) 174. The function of the fourth joint portion 174 is to support the third link 14 and the fourth link 15 connected to each other in such a manner that one of the third link 14 and the fourth link 15 is turnable with respect to the other. At this time, the fourth link 15 has a fourth rotation axis O4 as a rotation center, and is turnable about the fourth rotation axis O4 with respect to the third link 14. The fourth rotation axis O4 is orthogonal to the third rotation axis O3. The turning about the fourth rotation axis O4 is realized by the driving of a fourth drive source 404. The fourth drive source 404 is driven by a motor 404M and a cable (not illustrated), and the robot control device 20 controls the motor 404M via a motor driver 304 that is electrically connected to the motor 404M. The fourth drive source 404 may transmit drive from the motor 404M via a speed reducer (not illustrated) that is provided along with the motor 404M, or the speed reducer may not be provided. The fourth rotation axis O4 may be parallel with an axis orthogonal to the third rotation axis O3. For example, the third link 14 accommodates the motor 404M.

The fourth link 15 and the fifth link 16 are connected to each other via a fifth joint portion (a joint) 175. The function of the fifth joint portion 175 is to support the fourth link 15 and the fifth link 16 connected to each other in such a manner that one of the fourth link 15 and the fifth link 16 is turnable with respect to the other. At this time, the fifth link 16 has a fifth rotation axis O5 as a rotation center, and is turnable about the fifth rotation axis O5 with respect to the fourth link 15. The fifth rotation axis O5 is orthogonal to the fourth rotation axis O4. The turning about the fifth rotation axis O5 is realized by the driving of a fifth drive source 405. The fifth drive source 405 is driven by a motor 405M and a cable (not illustrated), and the robot control device 20 controls the motor 405M via a motor driver 305 that is electrically connected to the motor 405M. The fifth drive source 405 may transmit drive from the motor 405M via a speed reducer (not illustrated) that is provided along with the motor 405M, or the speed reducer may not be provided. The fifth rotation axis O5 may be parallel with an axis orthogonal to the fourth rotation axis O4. For example, the fourth link 15 accommodates the motor 405M.

The wrist 17 has the sixth link 18 and the seventh link 19. A hand (not illustrated) as an end effector is detachably and attachably mounted on a distal end portion of the wrist 17 so as to hold precision equipment such as a wrist watch. The type of the hand is not limited to a specific type, and for example, may have a plurality of finger portions (fingers). The robot 1 can transport the precision equipment by controlling the operations of the links 12 to 16, the wrist 17, and the like while holding the precision equipment with the hand.

The fifth link 16 and the sixth link of the wrist 17 are connected to each other via a sixth joint portion (a joint) 176. The function of the sixth joint portion 176 is to support the fifth link 16 and the sixth link 18 of the wrist 17 connected to each other in such a manner that one of the fifth link 16 and the sixth link 18 of the wrist 17 is turnable with respect to the other. At this time, the sixth link 18 of the wrist 17 has a sixth rotation axis O6 as a rotation center, and is turnable about the sixth rotation axis O6 with respect to the fifth link 16. The sixth rotation axis O6 is orthogonal to the fifth rotation axis O5. The turning about the sixth rotation axis O6 is realized by the driving of a sixth drive source 406. The sixth drive source 406 is driven by a motor 406M and a cable (not illustrated), and the robot control device 20 controls the motor 406M via a motor driver 306 that is electrically connected to the motor 406M. The sixth drive source 406 may transmit drive from the motor 406M via a speed reducer (not illustrated) that is provided along with the motor 406M, or the speed reducer may not be provided.

The sixth link and the seventh link 19 of the wrist 17 are connected to each other via a seventh joint portion (a joint) 177. The function of the seventh joint portion 177 is to support the sixth link 18 and the seventh link 19 of the wrist 17 connected to each other in such a manner that one of the sixth link 18 and the seventh link 19 of the wrist 17 is turnable with respect to the other. At this time, the seventh link 19 of the wrist 17 has a seventh rotation axis O7 as a rotation center, and is turnable about the seventh rotation axis O7 with respect to the sixth link 18. The seventh rotation axis O7 is orthogonal to the sixth rotation axis O6. The turning about the seventh rotation axis O7 is realized by the driving of a seventh drive source 407. The seventh drive source 407 is driven by a motor 407M and a cable (not illustrated), and the robot control device 20 controls the motor 407M via a motor driver 307 that is electrically connected to the motor 407M. The seventh drive source 407 may transmit drive from the motor 407M via a speed reducer (not illustrated) that is provided along with the motor 407M, or the speed reducer may not be provided. The sixth rotation axis O6 may be parallel with an axis orthogonal to the fifth rotation axis O5, or the seventh rotation axis O7 may be parallel with an axis orthogonal to the sixth rotation axis O6. For example, the fifth link 16 accommodates the motors 406M and 407M.

The respective motors 401M to 407M or speed reducers of the drive sources 401 to 407 are respectively provided with a first angle sensor 411, a second angle sensor 412, a third angle sensor 413, a fourth angle sensor 414, a fifth angle sensor 415, a sixth angle sensor 416, and a seventh angle sensor 417. For example, an encoder, a rotary encoder, or the like can be used as the angle sensors 411 to 417. The angle sensors 411 to 417 detect the rotational angles of the rotary shafts of the respective motors 401M to 407M of the drive sources 401 to 407 or the speed reducers, respectively. The respective detected results of the angle sensors 411 to 417, that is, respective signals output from the angle sensors 411 to 417 are input to the robot control device 20. The robot control device 20 performs a predetermined control based on the detected results. The types of the respective motors 401M to 407M of the drive source 401 to 407 are not limited to specific types, and it is preferable that a servo motor such as an AC servo motor or a DC servo motor be used as the motors 401M to 407M.

An inertia sensor 31 is installed in the third link 14. In the embodiment, an angular velocity sensor is used as the inertia sensor 31, and detects angular velocity about x, y, and z axes (none of the axes is illustrated) that are three detection axes orthogonal to each other. Specifically, for example, a gyro sensor or the like can be used as the inertia sensor 31. The posture of the inertia sensor 31 is not limited to a specific posture, and for example, it is preferable that one of the three detection axes be parallel with or coincide with the third rotation axis O3.

The inertia sensor 31 detects angular velocity about the x axis, angular velocity about the y axis, and angular velocity about the z axis at the installation location of the inertia sensor 31. The detected results of the inertia sensor 31, that is, signals output from the inertia sensor 31 are input to the robot control device 20. The robot control device 20 performs a predetermined control based on the detected results.

The third link 14 is provided with the inertia sensor 31 so as to prevent the vibration of the third link 14 at the installation location of the inertia sensor 31, and the robot 1 controls the operations of the drive sources 401, 402, 403 based on the detected results of the inertia sensor 31. Accordingly, it is possible to reliably prevent the vibration of the third link 14 at the installation location of the inertia sensor 31, and thus it is possible to reliably prevent the vibration of a distal end portion of the robot arm 5.

The robot main body 10 is electrically connected to the robot control device 20. That is, the drive sources 401 to 407, the angle sensors 411 to 417, and the inertia sensor 31 are electrically connected to the robot control device 20.

The robot control device 20 can independently operate the links 12 to 16 and the wrist 17, that is, the robot control device 20 can independently control the drive sources 401 to 407 via the respective motor drivers 301 to 307. At this time, the angle sensors 411 to 417, the inertia sensor 31, and the like perform detection operations, and the robot control device 20 controls the driving of the drive sources 401 to 407, for example, the angular velocity or the rotational angle of the drive sources 401 to 407 based on the detected results. At this time, the robot control device 20 performs predetermined controls, for example, impedance control (a force control) or a position control. A control program is stored in a recording medium in advance that is built into the robot control device 20.

Subsequently, the configuration of the robot control device 20 will be described with reference to FIGS. 1 to 3.

The robot control device 20 is a device for controlling the operation of the entirety of the robot main body 10, that is, the operations of the first drive source 401, the second drive source 402, the third drive source 403, the fourth drive source 404, the fifth drive source 405, the sixth drive source 406, the seventh drive source 407, and a drive source of the hand that is mounted on the wrist 17.

As illustrated in FIG. 2, the robot control device 20 has a first drive source control unit (a control unit) 201 that controls the operation of the first drive source 401; a second drive source control unit (a control unit) 202 that controls the operation of the second drive source 402; a third drive source control unit (a control unit) 203 that controls the operation of the third drive source 403; a fourth drive source control unit (a control unit) 204 that controls the operation of the fourth drive source 404; a fifth drive source control unit (a control unit) 205 that controls the operation of the fifth drive source 405; a sixth drive source control unit (a control unit) 206 that controls the operation of the sixth drive source 406; and a seventh drive source control unit (a control unit) 207 that controls the operation of the seventh drive source 407.

Here, the robot control device 20 obtains a target position of the distal end portion of the wrist 17, that is, a target position of the hand mounted on the wrist 17, based on processes that are performed by the robot main body 10, and generates a trajectory so as to move the hand to the target position. The robot control device 20 measures the respective rotational angles of the drive sources 401 to 407 predetermined control intervals so as to move the hand (the wrist 17) along the generated trajectory, and outputs values to the drive source control units 201 to 207 as position commands Pc of the drive sources 401 to 407, respectively, the values being calculated based on the measured results. In the description above and hereinafter, the "input or output of a value" is stated, and indicates the "input or output of a signal corresponding to the value".

The first drive source control unit 201 receives the position command Pc of the first drive source 401; a detected signal output from the first angle sensor 411; and a correction value (to be described later) for preventing the vibration of the robot arm 5. The first drive source control unit 201 drives the first drive source 401 via a feedback control using detected signals in such a manner that the rotational angle (a position feedback value Pfb) of the first drive source 401 becomes the position command Pc, the rotational angle being calculated from the detected signals of the first angle sensor 411, and an angular velocity feedback value ωfb (to be described later) becomes an angular velocity command ωc (to be described later).

The position command Pc and the position feedback value Pfb (to be described later) are input to a first subtractor (not illustrated) of the first drive source control unit 201. The first drive source control unit 201 counts the number of pulses input from the first angle sensor 411, and the rotational angle of the first drive source 401 corresponding to a count value is output to the first subtractor as the position feedback value Pfb. The first subtractor outputs a deviation (a value obtained by subtracting the position feedback value Pfb from a target value of the rotational angle of the first drive source 401) between the position command Pc and the position feedback value Pfb.

The first drive source control unit 201 performs a predetermined calculation process using the deviation input from the first subtractor, a proportional gain that is a predetermined coefficient, and the like, and thus calculates a target value of the angular velocity of the first drive source 401 corresponding to the deviation. The first drive source control unit 201 outputs a signal as the angular velocity command (a drive command) ωc to a second subtractor (not illustrated), the signal indicating the target value (a command value) of the angular velocity of the first drive source 401. In the embodiment, the feedback control adopts a proportional control (a P control), but is not limited to the proportional control.

The first drive source control unit 201 calculates the angular velocity of the first drive source 401 based on the frequency of pulse signals input from the first angle sensor 411, and outputs the calculated angular velocity to the second subtractor. In addition, a correction value (a first correction value) (to be described later) for preventing the vibration of the robot arm 5 is output to the second subtractor from the first drive source control unit 201. At this time, the angular velocity of the first drive source 401 obtained based on the detected results of the first angle sensor 411, and the correction value are not input to the second subtractor as they are, and instead, a predetermined calculation is done using the angular velocity and the correction value, and the calculated result is output to the second subtractor as the angular velocity feedback value ωfb. The correction value will be described later.

The angular velocity command ωc and the angular velocity feedback value ωfb are input to the second subtractor. The second subtractor outputs a deviation (a value obtained by subtracting the angular velocity feedback value ωfb from a target value of the angular velocity of the first drive source 401) between the angular velocity command ωc and the angular velocity feedback value ωfb.

The first drive source control unit 201 performs a predetermined calculation process including integral calculus, using the deviation input from the second subtractor, a proportional gain that is a predetermined coefficient, an integral gain, and the like, and thus calculates a target value of the angular acceleration (a torque) of the first drive source 401 corresponding to the deviation. The first drive source control unit 201 generates a signal as an angular acceleration command (a torque command), the signal indicating the target value (a command value) of the angular acceleration of the first drive source 401. In the embodiment, the feedback control adopts PI control, but is not limited to the PI control.

The first drive source control unit 201 generates a drive signal (a drive current) of the first drive source 401 based on the angular acceleration command, and supplies the drive signal to the motor M401M via the motor driver 301 (a drive source control step).

The feedback control is performed in such a manner that the angular acceleration, that is, the torque of the first drive source 401 becomes as equal to the target value as possible, the position feedback value Pfb becomes as equal to the position command Pc as possible, and the angular velocity feedback value ωfb becomes as equal to the angular velocity command ωc as possible, and the drive current of the first drive source 401 is controlled.

The function of each of a second drive source control unit 202 and a third drive source control unit 203 is the same as the first drive source control unit 201, and thus the description thereof will be omitted.

The functions of each of a fourth drive source control unit 204 to a seventh drive source control unit 207 are the same as the first drive source control unit 201, except that a correction process using a correction value is not performed, and the angular velocity of each of the drive sources 404 to 407 obtained based on the respective detected results of the angle sensors 414 to 417 is output to the second subtractor as the angular velocity feedback value ωfb, and thus the description thereof will be omitted.

Subsequently, vibration prevention control using a correction value so as to prevent the vibration of the robot arm 5 will be described.

As illustrated in FIG. 3, the robot control device 20 has a vibration calculation unit 501; a correction value calculation unit 502; a weighting constant determination unit 503; a weighting execution unit 504; and the drive source control units 201 to 207. The configuration of a weighting unit includes the weighting constant determination unit 503 and the weighting execution unit 504.

First, as illustrated in FIG. 5, the inertia sensor 31 detects an angular velocity ω as vibration information. The vibration calculation unit 501 divides the angular velocity ω detected by the inertia sensor 31 into an angular velocity component about the third rotational center axis O3; an angular velocity component about the fourth rotational center axis O4; and an angular velocity component about an axis orthogonal to the third rotational center axis O3 and the fourth rotational center axis O4 (a vibration calculation step).

Subsequently, the correction value calculation unit 502 obtains a first correction value (a correction value) ω1 for correcting an angular velocity command (a drive command) of the first drive source 401; a correction value ω3 for correcting an angular velocity command (a drive command) of the second drive source 402; and a second correction value (a correction value) ω2 for correcting an angular velocity command (a drive command) of the third drive source 403, based on the angular velocity components and the respective detected results of the first angle sensor 411, the second angle sensor 412, and the third angle sensor 413 (a correction value calculation step). At this time, an inverse matrix (inverse Jacobian) of a predetermined Jacobi matrix (Jacobian) is used, and the predetermined Jacobi matrix indicates a relationship between the angular velocity of a third link coordinate system and the angular velocity of the drive source. The first correction value ω1 is equivalent to a vibration component of the angular velocity about the first rotational center axis O1, the second correction value ω2 is equivalent to a vibration component of the angular velocity about the third rotational center axis O3, and the correction value ω3 is equivalent to a vibration component of the angular velocity about the second rotational center axis O2.

Subsequently, a weighting constant is set so as to correspond to the posture of the robot arm 5, and the first correction value ω1 and the second correction value ω2 are weighted (a weighting step).

At this time, first, the angle sensor 412 detects an angle θ that is formed by the first rotation axis O1 and the third rotation axis O3, and the weighting constant determination unit 503 compares the detected angle θ with first, second, third, and fourth threshold values (refer to FIG. 4) which are set in advance. In the embodiment, the angle θ is set to a range of −180° or greater and 180° or less. The angle θ in counter-clockwise and clockwise directions indicates "positive" and "negative" angles, respectively. A relationship between the magnitudes of the first, second, third, and fourth threshold values is "the first threshold value<the second threshold value<the third threshold value<the fourth threshold value".

Here, as illustrated in FIG. 5, when the angle θ is close to 90°, the first correction value ω1 and the second correction value ω2 are relatively small, and thus a problem does not occur. However, as illustrated in FIG. 6, when the angle θ is close to 180° or 0°, that is, when the posture of the robot arm 5 is close to a specific posture (a specific point), the first correction value ω1 and the second correction value ω2 increase. In the robot 1, the weighting constant determination unit 503 sets a weighting constant so as to correspond to the angle θ, and performs the weighting of the first correction value ω1 for correcting the angular velocity command of the first drive source 401, and the second correction value ω2 for correcting the angular velocity command of the third drive source 403. Hereinafter, the first correction value ω1, the second correction value ω2, and the third correction value ω3 are referred to as the first correction value (a correction value), the second correction value (a correction value), and a correction value, respectively.

When an absolute value of the angle θ is less than or equal to the first threshold value or greater than or equal to the fourth threshold value, the weighting constant determination unit 503 sets the weighting constant to zero. For example, the weighting constant is set as an amplification factor of an amplifier of the weighting execution unit 504.

When an absolute value of the angle θ is greater than or equal to the second threshold value and less than or equal to the third threshold value, the weighting constant determination unit 503 sets the weighting constant to one.

When an absolute value of the angle θ is greater than the first threshold value and less than the second threshold value, the weighting constant determination unit 503 increases the weighting constant as the absolute value of the angle θ increases. At this time, the weighting constant determination unit 503 may increase the weighting constant continuously or stepwise. FIG. 4 illustrates a configuration example in which the weighting constant is continuously increased. In the configuration example illustrated in FIG. 4, a rate of increase of the weighting constant is constant, and may not be constant.

When an absolute value of the angle θ is greater than the third threshold value and less than the fourth threshold value, the weighting constant determination unit 503 decreases the weighting constant as the absolute value of the angle θ increases. At this time, the weighting constant determination unit 503 may decrease the weighting constant continuously or stepwise. FIG. 4 illustrates a configuration example in which the weighting constant is continuously decreased. In the configuration example illustrated in FIG. 4, a rate of decrease of the weighting constant is constant, and may not be constant.

The first threshold value is not limited to a specific value, and is set depending on conditions. However, the first threshold value is preferably set to 5° or greater and 25° or less, and more preferably, 10° or greater and 23° or less. When the first threshold value is less than the lower limit value, there is a problem in that a correction value increases due to other conditions, a feedback amount considerably increases, and control becomes unstable. When the first threshold value is greater than the upper limit value, there is a problem in that satisfactory effects of vibration prevention cannot be obtained due to other conditions.

The second threshold value is not limited to a specific value, and is set depending on conditions. However, the second threshold value is preferably set to 35° or greater and 50° or less, and more preferably, 37° or greater and 45° or less. When the second threshold value is less than the lower limit value, there is a problem in that a correction value increases due to other conditions, a feedback amount considerably increases, and control becomes unstable. When the second threshold value is greater than the upper limit value, there is a problem in that satisfactory effects of vibration prevention cannot be obtained due to other conditions.

The third threshold value is not limited to a specific value, and is set depending on conditions. However, the third threshold value is preferably set to 130° or greater and 145° or less, and more preferably, 135° or greater and 143° or less. When the third threshold value is less than the lower limit value, there is a problem in that satisfactory effects of vibration prevention cannot be obtained due to other conditions. When the third threshold value is greater than the upper limit value, there is a problem in that a correction value increases due to other conditions, a feedback amount considerably increases, and control becomes unstable.

The fourth threshold value is not limited to a specific value, and is set depending on conditions. However, the fourth threshold value is preferably set to 155° or greater and 175° or less, and more preferably, 157° or greater and 170° or less. When the fourth threshold value is less than the lower limit value, there is a problem in that satisfactory effects of vibration prevention cannot be obtained due to other conditions. When the fourth threshold value is greater than the upper limit value, there is a problem in that a correction value increases due to other conditions, a feedback amount considerably increases, and control becomes unstable.

Subsequently, the weighting execution unit 504 performs the weighting of the first and second correction values input from the correction value calculation unit 502, using the weighting constant set by the weighting constant determination unit 503. The weighting execution unit 504 is not required to perform the weighting of the correction value for correcting the angular velocity command of the second drive source 402. The weighted first correction value and the weighted second correction value are respectively input to the first drive source control unit 201 and the third drive source control unit 203. The non-weighted correction value is input to the second drive source control unit 202.

As described above, the first drive source control unit 201 obtains the angular velocity feedback value ωfb that is applied to the angular velocity command ωc via a feedback control, based on the weighted first correction value and the angular velocity of the first drive source 401 which is calculated based on the frequency of pulse signals input from the first angle sensor 411. The second drive source control unit 202 obtains the angular velocity feedback value ωfb that is applied to the angular velocity command ωc via a feedback control, based on the non-weighted correction value and the angular velocity of the second drive source 402 which is calculated based on the frequency of pulse signals input from the second angle sensor 412. The third drive source control unit 203 obtains the angular velocity feedback value ωfb that is applied to the angular velocity command θc via a feedback control, based on the weighted second correction value and the angular velocity of the third drive source 403 which is calculated based on the frequency of pulse signals input from the third angle sensor 413. Since the control operations of the first drive source control unit 201, the second drive source control unit 202, and the third drive source control unit 203 are described above, the description thereof will be omitted.

As described above, the robot 1 performs the weighting of the first and second correction values depending on the posture of the robot arm 5, and thus can decrease the first and second correction values. Accordingly, even when the posture of the robot arm 5 is close to a specific posture, the robot 1 can prevent the vibration of the robot arm 5 while stably operating the robot arm 5.

Second Embodiment

Figure 7:
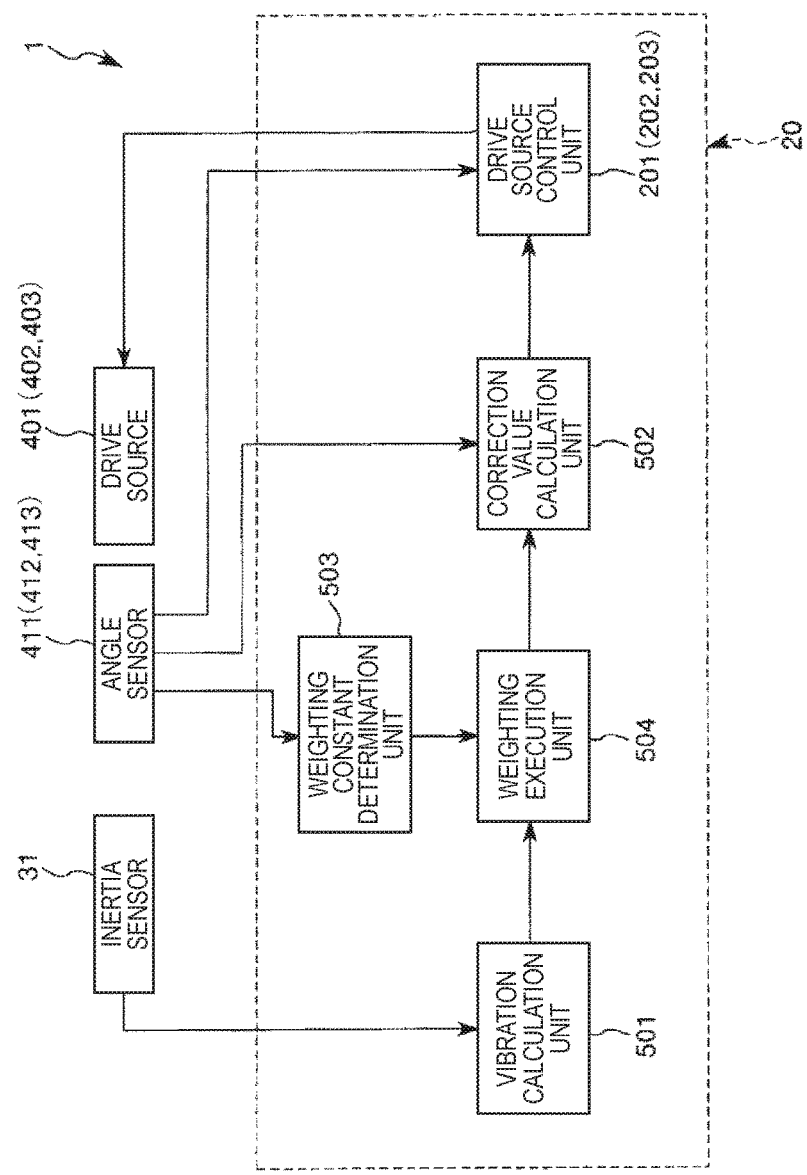
FIG. 7 is a block diagram illustrating a second embodiment of the robot according to the invention.

FIG. 7 is a block diagram of a second embodiment of the robot according to the invention.

Hereinafter, points of differences in the second embodiment from the first embodiment will be mainly described, and the descriptions of the same matters will be omitted.

As described in FIG. 7, in the second embodiment, the robot control device 20 of the robot 1 performs the weighting of vibration information depending on the posture of the robot arm 5, the vibration information being obtained by the vibration calculation unit 501. That is, the weighting constant determination unit 503 sets a weighting constant, and the weighting execution unit 504 performs the weighting of the an angular velocity component about the third rotational center axis O3; an angular velocity component about the fourth rotational center axis O4; and an angular velocity component about an axis orthogonal to the third rotational center axis O3 and the fourth rotational center axis O4, the angular velocity components being obtained by dividing the angular velocity ω that is detected by the inertia sensor 31 (a weighting step).

Subsequently, the correction value calculation unit 502 obtains the first correction value (a correction value) ω1 for correcting an angular velocity command (a drive command) of the first drive source 401; the correction value for correcting an angular velocity command (a drive command) of the second drive source 402; and the second correction value (a correction value) for correcting an angular velocity command (a drive command) of the third drive source 403, based on the weighted angular velocity components and the respective detected results of the first angle sensor 411, the second angle sensor 412, and the third angle sensor 413 (a correction value calculation step). The first correction value ω1, the second correction value ω2, and the correction value ω3 are respectively equivalent to the weighted first correction value ω1, the weighted second correction value ω2, and the weighted correction value ω3 in the first embodiment.

The subsequent operations are the same as those in the first embodiment, and thus the description thereof will be omitted.

In the robot 1 of the second embodiment, it is possible to obtain the same effects as in the first embodiment.

Third Embodiment

Figure 8:
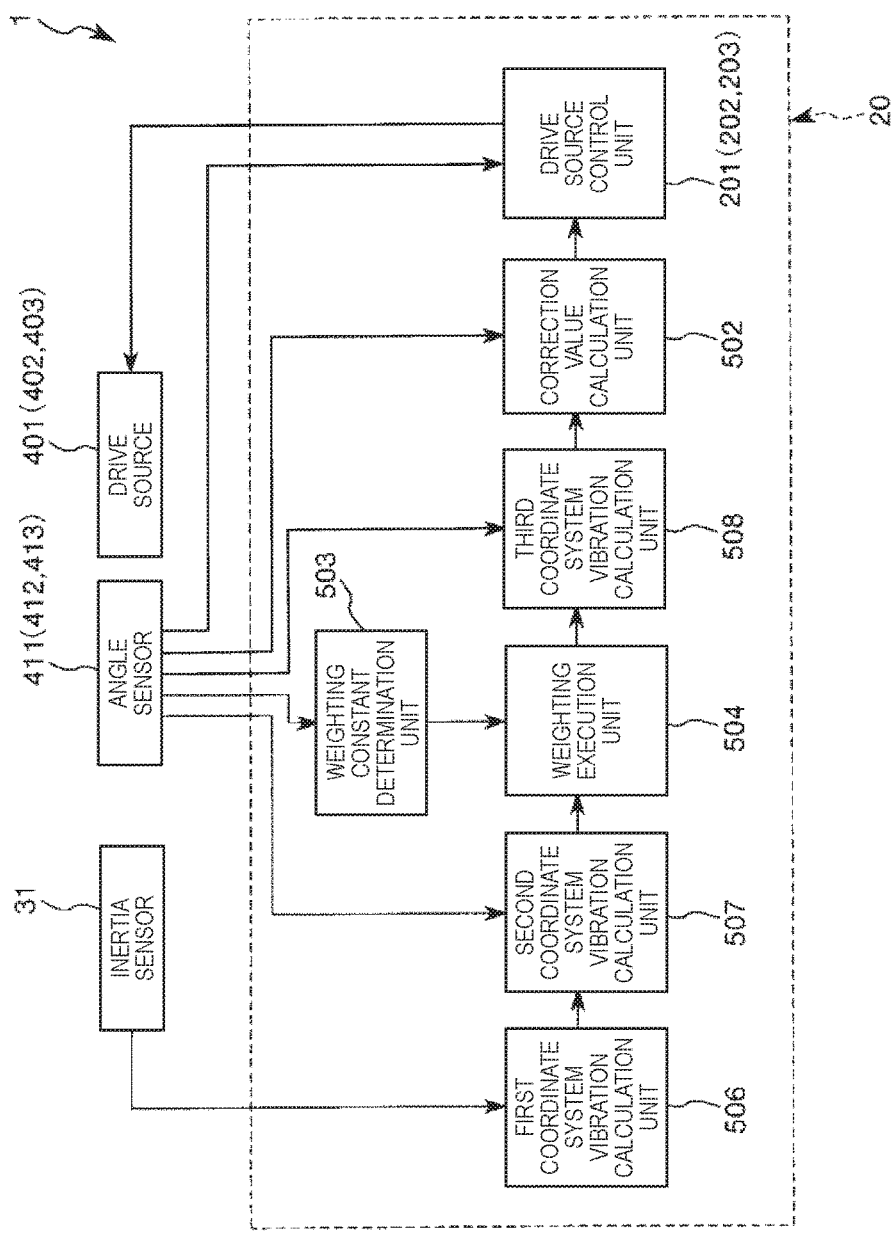
FIG. 8 is a block diagram illustrating a third embodiment of the robot according to the invention.

FIG. 8 is a block diagram illustrating a third embodiment of the robot according to the invention. FIGS. 9A to 9D are diagrams illustrating vibration information and a correction value of the robot according to the third embodiment of the invention.

Hereinafter, points of differences in the third embodiment from the first embodiment will be mainly described, and the descriptions of the same matters will be omitted.

As illustrated in FIG. 8, in the third embodiment, the robot control device 20 of the robot 1 has a first coordinate system vibration calculation unit 506; a second coordinate system vibration calculation unit 507; the weighting constant determination unit 503; the weighting execution unit 504; a third coordinate system vibration calculation unit 508; the correction value calculation unit 502; and the drive source control units 201 to 207.

In the robot, first, the inertia sensor 31 detects the angular velocity ω as vibration information. The first coordinate system vibration calculation unit 506 divides the angular velocity ω detected by the inertia sensor 31 into an angular velocity component about the third rotational center axis O3 in a first coordinate system that is set in the third link 14; an angular velocity component about the fourth rotational center axis O4; and an angular velocity component about an axis orthogonal to the third rotational center axis O3 and the fourth rotational center axis O4 (a first coordinate system vibration calculation step).

Figures 9A, 9B, 9C, 9D:
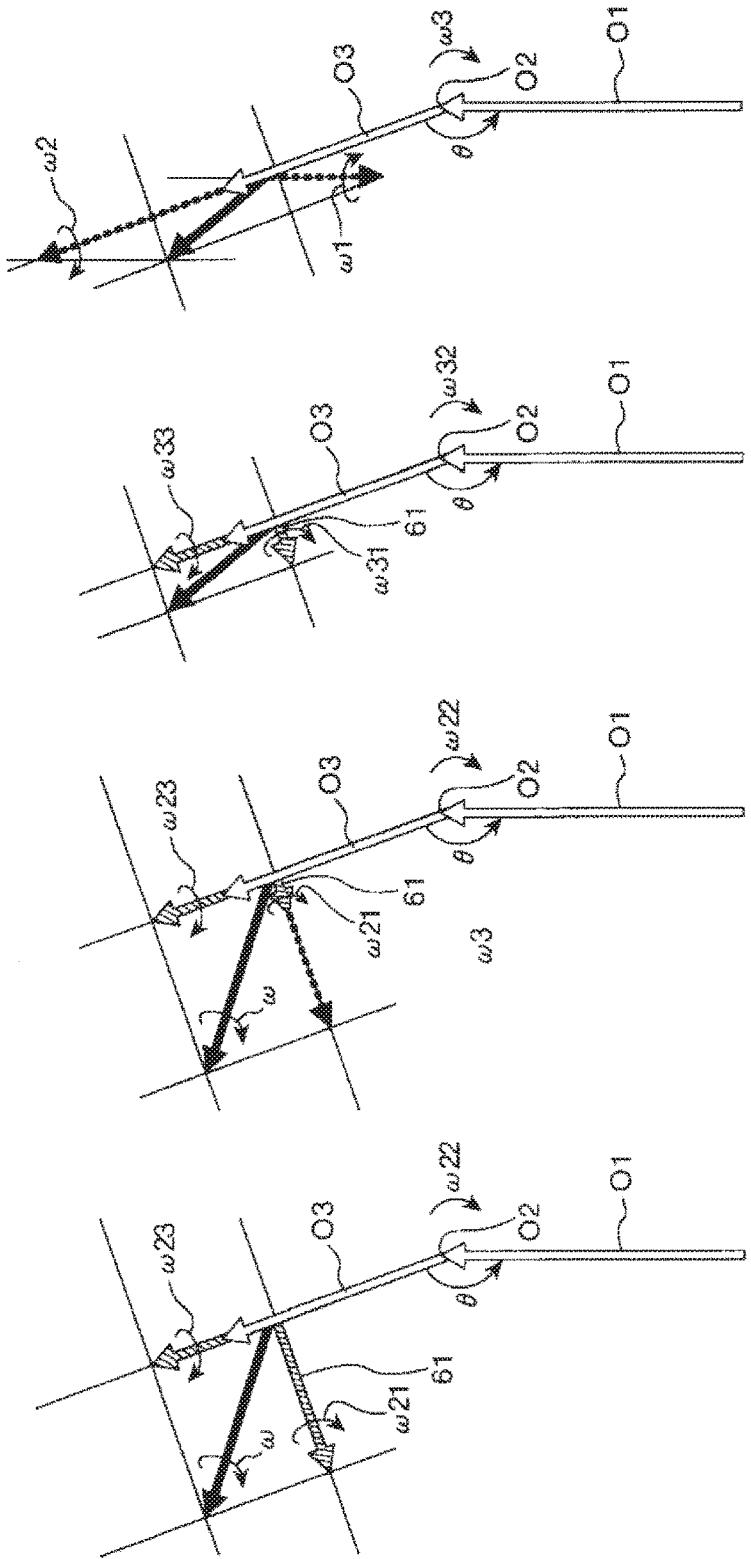
FIGS. 9A to 9D are diagrams illustrating vibration information and a correction value of the robot according to the third embodiment of the invention.

Subsequently, as illustrated in FIG. 9A, the second coordinate system vibration calculation unit 507 performs the coordinate transformation of vibration information in the first coordinate system into vibration information in a second coordinate system that is set in the second link 13 (a second coordinate system vibration calculation step). At this time, in the embodiment, the second coordinate system vibration calculation unit 507 performs the coordinate transformation of the angular velocity components in the first coordinate system into a vibration component (angular velocity) ω23 about the third rotation axis O3; a vibration component (angular velocity) ω22 about the second rotation axis O2; and a vibration component (angular velocity) ω21 about an axis 61 that is orthogonal to the third rotation axis O3 and the second rotation axis O2, based on the respective detected results of the first angle sensor 411, the second angle sensor 412, and the third angle sensor 413.

Similar to the first embodiment, the weighting constant determination unit 503 and the weighting execution unit 504 perform the weighting of the vibration component in a predetermined coordinate axis direction of the second coordinate system, depending on the posture of the robot arm 5 (a weighting step). The predetermined coordinate axis direction is any one of directions which are respectively orthogonal to the first rotation axis O1 and the third rotation axis O3. In the embodiment, the predetermined coordinate axis direction is a direction orthogonal to the third rotation axis O3 and the second rotation axis O2. That is, as illustrated in FIG. 9B, the weighting constant determination unit 503 and the weighting execution unit 504 perform the weighting of the vibration component ω21 about the axis 61 that is orthogonal to the third rotation axis O3 and the second rotation axis O2 in the second coordinate system, depending on the posture of the robot arm 5. Accordingly, it is possible to decrease the correction values.

Subsequently, as illustrated in FIG. 9C, the third coordinate system vibration calculation unit 508 performs the coordinate transformation of the weighted vibration information in the second coordinate system into vibration information in a third coordinate system that is set in the third link 14 (a third coordinate system vibration calculation step). At this time, in the embodiment, the third coordinate system vibration calculation unit 508 performs the coordinate transformation of the vibration components ω23, ω22, ω21 in the second coordinate system into a vibration component (angular velocity) ω33 about the third rotation axis O3; a vibration component (angular velocity) ω32 about the second rotation axis O2; and a vibration component (angular velocity) ω31 about the axis 61 that is orthogonal to the third rotation axis O3 and the second rotation axis O2, based on the respective detected results of the first angle sensor 411, the second angle sensor 412, and the third angle sensor 413.

Subsequently, as illustrated in FIG. 9D, similar to the first embodiment, the correction value calculation unit 502 obtains the first correction value ω1 for correcting an angular velocity command (a drive command) of the first drive source 401; the correction value ω3 for correcting an angular velocity command (a drive command) of the second drive source 402; and the second correction value ω2 for correcting an angular velocity command (a drive command) of the third drive source 403, based on the vibration information in the third coordinate system obtained by the third coordinate system vibration calculation unit 508 and the respective detected results of the first angle sensor 411, the second angle sensor 412, and the third angle sensor 413, using an inverse matrix of a predetermined Jacobi matrix, the predetermined Jacobi matrix indicating a relationship between the angular velocity of the third link coordinate system and the angular velocity of the drive source (a correction value calculation step).

The subsequent operations are the same as those in the first embodiment, and thus the description thereof will be omitted.

In the robot 1 of the third embodiment, it is possible to obtain the same effects as in the first embodiment.

The robot 1 performs the weighting of a component of the vibration information in the predetermined coordinate axis direction of the second coordinate system, depending on the posture of the robot arm 5, and the robot 1 can decrease a correction component among the correction values which is less effective in preventing the vibration of the robot arm 5, that is, an unnecessary correction component. Accordingly, it is possible to prevent vibration quickly and reliably.

In the embodiment, the robot 1 is configured so as to keep a rotation component about the third rotation axis O3 of the third link 14, and to perform the weighting of a rotation component about the axis orthogonal to the third rotation axis O3. However, the invention is not limited to the configuration, and the robot 1 may be configured so as to keep a rotation component about the first rotation axis O1 of the first link 12, and to perform the weighting of a rotation component about the axis orthogonal to the first rotation axis O1. At this time, for example, the second coordinate system is set in the first link 12. That is, the second coordinate system is preferably set in a link that is disposed further on the distal end side than a link provided with the inertia sensor 31.

The third coordinate system is preferably set in a link different from a link in which the second coordinate system is set.

Fourth Embodiment

Figure 10:
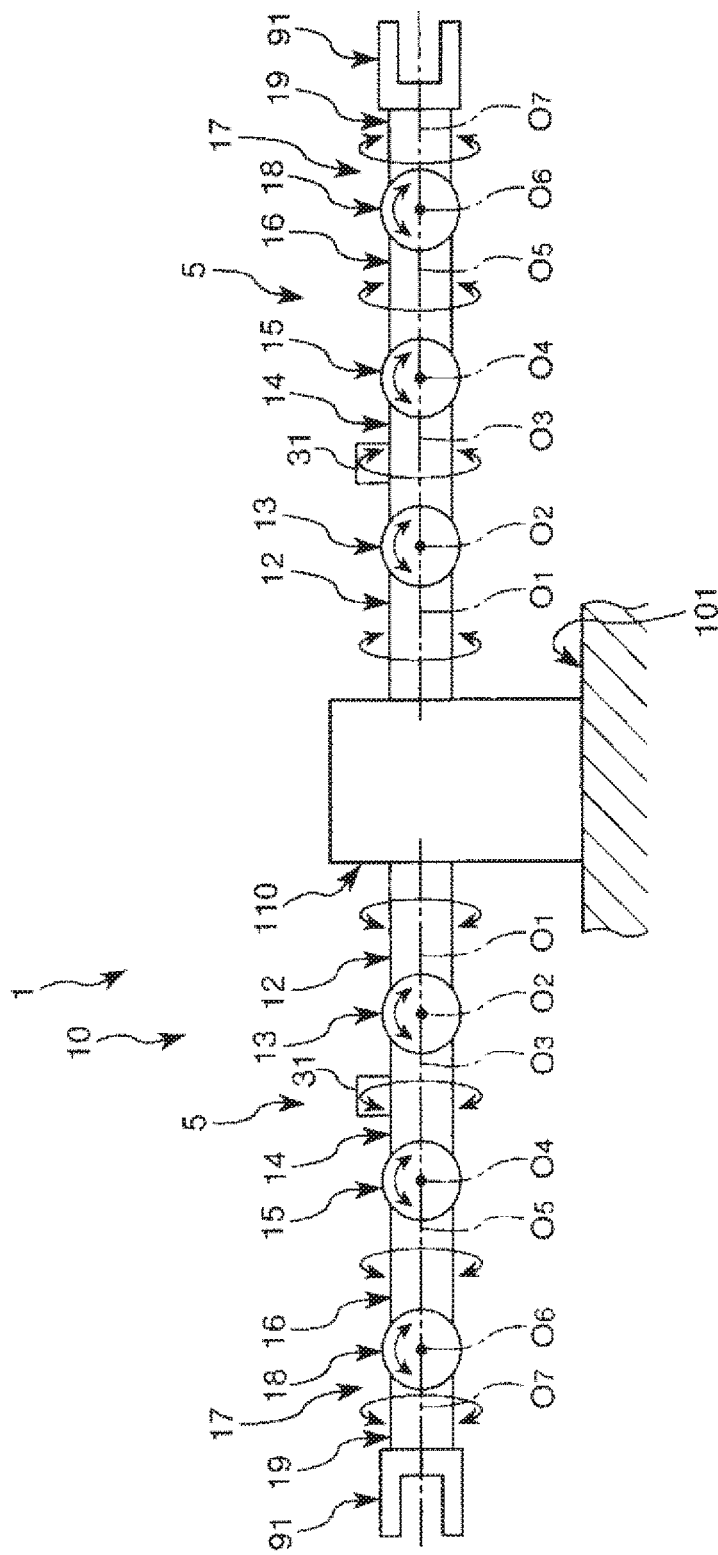
FIG. 10 is a schematic view of the robot main body of the robot according to a fourth embodiment of the invention.

FIG. 10 is a schematic view of the robot main body of the robot according to a fourth embodiment of the invention.

Hereinafter, points of differences in the fourth embodiment from the first embodiment will be mainly described, and the descriptions of the same matters will be omitted.

As described in FIG. 10, in the fourth embodiment, the robot 1 is a dual-arm robot, and the robot main body 10 includes two robot arms 5 and a trunk portion 110 as a base (a supporting portion) that supports the robot arms 5. For example, the robot 1 can hold a certain target object with each of two hands 91, and performs work.

In the robot 1 of the fourth embodiment, it is possible to obtain the same effects as in the first embodiment.

The robot 1 can perform a variety of operations and work.

The number of robot arms is not limited to two, and may be three or more.

The fourth embodiment is also applicable to the second embodiment and the third embodiment.

The robot control device, the robot, and the robot control method according to the invention are described based on the illustrated embodiments, but the invention is not limited to the embodiments, and the configuration of each portion can be replaced with an arbitrary configuration having the same function. Other arbitrary configuration objects or steps may be added to the invention.

The invention may be implemented by the combination of two or more arbitrary configurations (characteristics) between the embodiments.

For example, a stepping motor or the like other than the servo motor may be used as the motor of each drive source. When the stepping motor is used as the motor, the angle sensor may detect the rotational angle of the motor by measuring the number of drive pulses that are input to the stepping motor.

The type of the angle sensor is not limited to a specific type, and for example, may be an optical angle sensor, a magnetic angle sensor, an electro-magnetic angle sensor, an electrical angle sensor, or the like.

In the embodiments, the number of rotation axes of the robot arm is seven, but the invention is not limited to the number of rotation axes in the embodiments. For example, the number of rotation axes of the robot arm may be three, four, five, six, or eight or greater. That is, in the embodiments, since the wrist has two links, the number of links of the robot arm is seven, but the invention is not limited to the number of links of the wrist in the embodiments. For example, the number of links of the robot arm may be three, four, five, six, or eight or greater.

In the invention, the robot (the robot main body) may be another type of robot, for example, a legged walking (travelling) robot or the like.

In the embodiment, the inertia sensor is provided in a third link from the base, but the invention is not limited to the installation location in the embodiments. The inertia sensor may be provided in a fourth or subsequent link from the base.

In the embodiment, the angular velocity sensor is used as the inertia sensor, but the invention is not limited to the use of the angular velocity sensor in the embodiments. For example, an acceleration sensor or the like may be used as the inertia sensor.

In the embodiments, the robot arm is provided with the inertia sensor, but the invention is not limited to the installation configuration in the embodiments. The robot arm may not be provided with the inertia sensor.

In the embodiment, the robot arm is provided with the angle sensor, but the invention is not limited to the installation configuration in the embodiments. The robot arm may not be provided with the angle sensor.

What is claimed is:

1. A robot comprising:
a base;
a robot arm comprising a first arm that is provided to the base and rotates around a first rotation axis, a second arm that rotates around a second rotation axis in a direction intersecting a direction of the first rotation axis; and
an inertia sensor that detects an angular velocity or acceleration, and provided to the robot arm;
wherein the robot arm is controlled based on a output from the inertia sensor and a weighting, and
the weighting of a case that the robot arm is a first posture is different from the weighting of a case that the robot arm is a second posture.

2. The robot according to claim 1, wherein
the first posture is close to a specific posture than the second posture.

3. The robot according to claim 2, wherein
the weighting of the case that the robot arm is the first posture is low than the weighting of the case that the robot arm is the second posture.

4. The robot according to claim 1, wherein
the robot arm comprising a third arm that is provided to the second arm and rotates around a third rotation axis in a direction parallel to a direction of the second rotation axis, a fourth arm that is provided to the third arm and rotates around a fourth rotation axis in a direction intersecting a direction of the third rotation axis, a fifth arm that is provided to the fourth arm and rotates around a fifth rotation axis in a direction intersecting a direction of the fourth rotation axis, and a sixth arm that is provided to the fifth arm and rotates around a sixth rotation axis in a direction intersecting a direction of the fifth rotation axis.

5. The robot according to claim 2, wherein
the robot arm comprising a third arm that is provided to the second arm and rotates around a third rotation axis in a direction parallel to a direction of the second rotation axis, a fourth arm that is provided to the third arm and rotates around a fourth rotation axis in a direction intersecting a direction of the third rotation axis, a fifth arm that is provided to the fourth arm and rotates around a fifth rotation axis in a direction intersecting a direction of the fourth rotation axis, and a sixth arm that is provided to the fifth arm and rotates around a sixth rotation axis in a direction intersecting a direction of the fifth rotation axis.

6. The robot according to claim 3, wherein
the robot arm comprising a third arm that is provided to the second arm and rotates around a third rotation axis in a direction parallel to a direction of the second rotation axis, a fourth arm that is provided to the third arm and rotates around a fourth rotation axis in a direction intersecting a direction of the third rotation axis, a fifth arm that is provided to the fourth arm and rotates around a fifth rotation axis in a direction intersecting a direction of the fourth rotation axis, and a sixth arm that is provided to the fifth arm and rotates around a sixth rotation axis in a direction intersecting a direction of the fifth rotation axis.

7. The robot according to claim 4, wherein the inertia sensor is provided to at least one of the third arm, the fourth arm, the fifth arm and the sixth arm.

8. The robot according to claim 4, wherein the inertia sensor is provided to the third arm.

9. The robot according to claim 1, wherein the first rotation axis coincides with a normal line of an installation surface of the base.

10. The robot according to claim 1, wherein the inertia sensor is a gyroscope sensor.

11. The robot according to claim 1, wherein a vibration of the robot arm is suppressed based on an output from the inertia sensor.

12. The robot according to claim 2, wherein a vibration of the robot arm is suppressed based on an output from the inertia sensor.

13. The robot according to claim 3, wherein a vibration of the robot arm is suppressed based on an output from the inertia sensor.

14. The robot according to claim 4, wherein a vibration of the robot arm is suppressed based on an output from the inertia sensor.

15. The robot according to claim 5, wherein a vibration of the robot arm is suppressed based on an output from the inertia sensor.

16. The robot according to claim 6, wherein a vibration of the robot arm is suppressed based on an output from the inertia sensor.

17. The robot according to claim 7, wherein a vibration of the robot arm is suppressed based on an output from the inertia sensor.

18. The robot according to claim 8, wherein a vibration of the robot arm is suppressed based on an output from the inertia sensor.

19. A robot control device controlling the robot according to claim 1.

20. A method of controlling a robot having a base, comprising:

provided a robot arm with a first arm that is provided to the base and rotates around a first rotation axis, providing the robot arm with a second arm that rotates around a second rotation axis in a direction intersecting a direction of the first rotation axis; and using an inertia sensor that detects an angular velocity or acceleration, and providing an output to the robot arm;

controlling the robot arm based on the output from the inertia sensor and a weighting, and the weighting being a function of a posture of the robot arm, the weighting when the robot arm is a first posture being different from the weighting when the robot arm is a second posture.

* * * * *